US 7,549,816 B2

(12) United States Patent
Glynn et al.

(10) Patent No.: US 7,549,816 B2
(45) Date of Patent: Jun. 23, 2009

(54) METERED DOSE SQUEEZE DISPENSER WITH BRUSH

(75) Inventors: Kenneth P. Glynn, Flemington, NJ (US); Stuart W. DeJonge, Lake Ariel, PA (US)

(73) Assignee: Glynntech, Inc., Flemington, NJ (US)

( * ) Notice: Subject to any disclaimer, the term of this patent is extended or adjusted under 35 U.S.C. 154(b) by 744 days.

(21) Appl. No.: 11/254,632

(22) Filed: Oct. 20, 2005

(65) Prior Publication Data

US 2006/0110205 A1    May 25, 2006

Related U.S. Application Data

(63) Continuation-in-part of application No. 10/993,764, filed on Nov. 19, 2004, now Pat. No. 7,350,673.

(51) Int. Cl.
*A46B 11/04* (2006.01)
*A47L 13/22* (2006.01)

(52) U.S. Cl. ............... 401/270; 401/186; 401/183; 401/184; 401/268

(58) Field of Classification Search ......... 401/270, 401/272, 282, 284, 183–186
See application file for complete search history.

(56) References Cited

U.S. PATENT DOCUMENTS

| | | | |
|---|---|---|---|
| 2,730,270 A | 1/1956 | Heinemann | |
| 2,942,762 A | 6/1960 | Fahr | |
| 2,979,236 A | 4/1961 | Fahr | |
| 2,989,216 A * | 6/1961 | Moro-Lin | 222/207 |
| 3,203,454 A | 8/1965 | Micallef | |
| 3,347,420 A | 10/1967 | Donoghue | |
| 3,628,700 A * | 12/1971 | Dodoghue | 222/187 |
| 3,663,113 A | 5/1972 | Frain et al. | |
| 3,878,972 A | 4/1975 | Por | |
| 4,077,547 A * | 3/1978 | Donoghue | 222/207 |
| 4,162,749 A | 7/1979 | Bennett | |
| 4,190,180 A | 2/1980 | Bennett | |
| 4,211,346 A | 7/1980 | Mehra et al. | |
| 4,541,552 A | 9/1985 | Scheithauer | |
| 4,625,897 A | 12/1986 | Wortley | |
| 4,779,767 A | 10/1988 | Griffiths | |
| 5,127,553 A * | 7/1992 | Weinstein | 222/158 |
| 5,199,808 A | 4/1993 | Gueret | |
| 5,547,303 A * | 8/1996 | Pyrozyk | 401/270 |
| 5,568,990 A | 10/1996 | McAuley | |
| 5,899,624 A | 5/1999 | Thompson | |
| 6,758,620 B1 * | 7/2004 | Harrold | 401/264 |
| 7,222,755 B2 * | 5/2007 | Glynn et al. | 222/205 |

(Continued)

FOREIGN PATENT DOCUMENTS

DE    1075967    2/1960

(Continued)

*Primary Examiner*—Khoa D Huynh
*Assistant Examiner*—Keegan Gumbs
(74) *Attorney, Agent, or Firm*—Kenneth P. Glynn, Esq.

(57) ABSTRACT

A liquid metered dispensing squeeze bottle includes: (a.) a squeezable container having an opening for dispensing liquid therefrom at one end and a bottom at the other end; (b.) a non-flexible trap chamber of a predetermined volume, connected to the opening of the container; (c.) a dip tube; (d.) a one way valve at the bottom of the dip tube; and (e.) a brush connected to the dispensing end of said trap chamber.

18 Claims, 4 Drawing Sheets

| U.S. PATENT DOCUMENTS | | | |
|---|---|---|---|
| 7,331,489 B2 * | 2/2008 | Glynn et al. | 222/211 |
| 7,350,673 B2 * | 4/2008 | Glynn et al. | 222/205 |
| 2002/0094225 A1 * | 7/2002 | Gueret | 401/183 |

FOREIGN PATENT DOCUMENTS

| DE | 3819-098 A | 1/1989 |
|---|---|---|
| EP | 383-644 A | 8/1990 |
| NL | 7613-833 | 6/1978 |
| NL | 7712-828 | 5/1979 |
| PK | 110059 | 8/1960 |

* cited by examiner

METERED DOSE SQUEEZE DISPENSER WITH BRUSH

REFERENCE TO RELATED APPLICATIONS

This application is a continuation-in-part of U.S. Utility patent application Ser. No. 10/993,764, entitled "METERED DOSE SQUEEZE DISPENSER" and filed on Nov. 19, 2004 now U.S. Pat. No. 7,350,673 by the same inventors herein.

BACKGROUND OF THE INVENTION

1. Field of the Invention

The present invention relates to squeeze dispensers for metered dose dispensing of a liquid, such as vitamins, medications, four stroke motor oil, etc. The present invention dispensers rely upon a unique combination of trap chamber, dip tube and valving at the bottom of the dip tube. They also have a brush at the dispensing end for application of the dispensed liquid by brushing.

2. Information Disclosure Statement

The following prior art is representative of the state of the art in the field of metered dispensing:

U.S. Pat. No. 2,730,270 describes a combination liquid measuring and dispensing device comprising in combination with a compressible container, a liquid flow conduit in said container and extending through the uppermost end of the latter; an elongated measuring tube having the lowermost end thereof disposed adjacent said uppermost end of the container exteriorly of the latter; and a laterally-extending pouring spout integral with the tube at the uppermost end thereof and provided with a restricted outlet orifice, said conduit extending into the tube through said lowermost end and on the longitudinal axis of the latter and being joined to said lowermost end of the tube in closing relationship thereto, a portion of the conduit within the tube extending at an angle in a direction opposite to the pouring spout and terminating in an uppermost open end spaced from the pouring spout on one side of said longitudinal axis of the tube whereby, when the container is grasped and tilted to pour the contents of the tube through said orifice, said contents will not flow into the container through the conduit, a portion of the conduit within the container extending at an angle in the direction of the pouring spout, whereby to prevent flow of liquid from the container into the tube during the aforementioned pouring operation.

U.S. Pat. No. 2,942,762 describes a dispenser for attachment to a primary reservoir having a threaded top comprising, in combination, a flexible cap characterized by a convex circular top and generally cylindrical side wall portions defining an internal cap reservoir, intersecting slits in the top of the cap defining flaps, a reinforcing ring integral with the cap top and ringing the flap bases, an internal mounting shoulder at the base of the cap side walls, a check valve housing with an upper ring to engage the cap mounting shoulder, a threaded coupler defining a flexible cap receiving opening at its top, a cap lock ring within the coupler which cooperates with the check valve housing against upward movement relative to the coupler, and a delivery tube extending into the primary reservoir from the check valve housing which delivers the contents of the primary reservoir into the cap reservoir and through the discharge flaps responsive to the pumping action effected by flexing the cap top.

U.S. Pat. No. 2,979,236 describes a dispenser unit for attachment to a container for dispensing the contents thereof comprising a cap having a tapered portion for insertion within an opening of said container, said cap having portions external of said container consisting of interconnected front and rear walls and a top wall, said front wall being greater in height than said rear wall, the top wall of said cap extending from the upper edge of said front wall to the rear wall at an angle to the plane of the opening in said container, a protuberance from said front wall, said protuberance having a slit therein, said slit forming a valve for extruding the contents of said container, and a ball in said tapered portion forming a valve in series with said slit valve, said tapered portion, said front and rear walls, said top wall and said protuberance being integral and resilient.

U.S. Pat. No. 2,989,216 describes a portion dispensing container for liquid comprising a squeeze container having a flexible wall, a bottom, and a top having a reservoir section, a movable tunnel-shaped measuring cup having an outlet tip serving as the sole draining outlet for said cup, said cup being disposed within said container in a manner so that its sides ride vertically adjacent the sides of said reservoir section and its upper edge is abuttable against the top of said reservoir section, a separate ridge tube connectable at one end to said outlet tip and other end penetrating the bottom of said container in sealing relation therewith to allow discharge therethrough of said liquid when said container is inverted to fill said cup, then uprighted, and the wall is squeezed.

U.S. Pat. No. 3,203,454 describes a measuring cup for pressurized containers having a downwardly movable discharge valve operating member in an end wall, a tubular sleeve extending downwardly from the bottom wall of said cup, the bottom end of said sleeve being shaped to engage said member and surround the discharge opening of said container, said tubular sleeve extending above the bottom of said cup, discharge passages in the wall of said sleeve adjacent the inner face of the bottom wall of said cup, a closure for the end of said sleeve, said closure having a flange extending substantially beyond the wall of said sleeve and having at its outer edge an unbroken flat surface contacting the bottom wall of said cup and an annular groove within said flat surface, the discharge passages in said sleeve opening into said groove.

U.S. Pat. No. 3,347,420 describes a container for dispensing measured quantities of different liquids and comprising an integral multi-compartment body formed of flexible wall light-transmitting molded material, two of the said compartments being reservoirs formed with a common generally vertical web, at least one other compartment defining a measuring and dispensing chamber formed over the reservoir compartments and having a common generally horizontal separating wall therewith which is provided with an opening on each side of the vertical separating wall to provide communication with the respective reservoirs, the said horizontal separating wall being deeply grooved on opposite sides to connect the two reservoirs to the measuring and dispensing compartment by a generally horizontal web, the said measuring and dispensing compartment being formed with a top wall having a dispensing opening adapted to be closed by a cap and providing access to the openings in the horizontal separating wall for filling the reservoirs, a conduit means for opening in the horizontal separating wall and insertable therein through the dispensing opening, said conduit means including an opening at its upper end whereby liquid can be transferred independently from the reservoirs and in quantities determined by observing the liquid level in said chamber through the light-transmitting material and in total quantity determined by the liquid level at the discharge openings of said pouring spouts, the transferred liquid being thereafter dispensed from the measuring and dispensing chamber.

U.S. Pat. No. 3,628,700 describes a container and closure assembly that has a resilient lower storage chamber and a transparent upper dispensing chamber defined either in one unitary body, or in two units in a fitment between the chambers serves to transfer a predetermined quantity of liquid from the lower to the upper chamber upon squeezing the lower one. The upper portion of the dispensing and measuring chamber has discharge orifices defined therein, or in an insert provided in a top opening thereof. The insert may comprise either an orifice pattern, an atomizing spray nozzle, or a foam nozzle and may be capped off by a conventional cap.

U.S. Pat. No. 3,663,113 describes a fluid applicator assembly including a retainer ring adapted to be snugly fitted within the open end of a container, the ring having at one end an inwardly extending peripheral web member having a valve opening therein, a valve stem extending through the valve opening and having an abutment at one end lying against a cover means for the assembly and a valve head at its other end lying against the underside of the web, and a coil spring urging the valve stem in a forward direction, the wall of the web opening being inclined forwardly so as to define a valve seat and the wall of the web opening being further inclined inwardly so as to permit easy snap-in insertion of the valve stem through the opening.

U.S. Pat. No. 3,878,972 describes an apparatus for measuring and dispensing liquids that includes a flexible container which is squeezable operated to increase the pressure therein and thereby operate a fluid control valve mounted in a filler tube for discharge a quantity of fluid into a measuring receptacle mounted on the container, whereupon the decrease in pressure within the container caused by the discharge of fluid therefrom operates to open an air inlet valve allowing air to enter the container when the container is released.

U.S. Pat. No. 4,077,547 describes a measuring and dispensing apparatus for use with a flexible-wall container. It includes a dispensing means having an enlarged cylindrical base portion having an upper end and a lower end, the lower end disposed on the enlarged base portion, the upstanding portion also having a bore therein and an, outlet orifice disposed therein proximate the upper end and in fluid communication with the bore; the enlarged base portion having container engaging means thereon; wall means disposed around the dispensing means and forming, with the enlarged base portion a fluid measuring chamber, the chamber having an upper end having a fluid outlet; and a tube having an inlet end and an outlet end, the tube disposed so that the outlet end is disposed in the bore in the upstanding portion of the dispensing means and in fluid communication therewith, the inlet end adapted to be disposed in the flexible-wall container.

U.S. Pat. No. 4,162,749 describes a disposable squeezable dispenser employing a flexible container filled with a mixture of air and the liquid to be dispensed. The dispenser employs only two main parts (other than the container itself) plus a ball and dip tub. One of the main parts is a hollow pull top which cooperates with the other main part in a sealing operation which prevents leakage when the dispenser is not in use.

U.S. Pat. No. 4,190,180 describes the open neck of a vertical container of fluid that is covered by horizontal flexible diaphragm with an outer lip detachably engaging the periphery of the neck. A top disposed concave cup-like recess centrally disposed in the diaphragm has a hole in the bottom. A vertically elongated tube open at both ends extends through the hole and is sealed thereto, these ends being interconnected by a vertical bore. The bottom end extends into the fluid. The bore has a vertically elongated enlarged region which is disposed intermediate between the top and bottom tube ends. The top tube end has a plurality of horizontal spaced conduits interconnecting the bore with the interior of the recess. A sphere in said region is slidable up and down therein, being moved by gravity to the bottom of the region when the tube is upright and being moved by gravity at the top of the region when the tube is inverted. Two sealing devices are disposed in the region adjacent the top and bottom thereof respectively. The sphere when disposed in the top of the region engages the first device and when disposed in the bottom of the region engages the second device, each device when engaged by said sphere forming a closed neck valve through which said liquid cannot pass.

U.S. Pat. No. 4,211,346 describes a variable volume dispenser of the type wherein squeezing a manually deformable bottle forces liquid from the bottle up through a dispenser tube and into a measuring chamber a axially movable closure, captured with in the outlet end of the dispenser the is pushed or pulled to snap open or snap close the outlet end.

U.S. Pat. No. 4,541,552 describes a device for metering and dispensing liquid or semiliquid mediums, such as adhesives, paints, lacquers, oils, and anaerobic plastics, comprising a tube having a discharge port and a first valve seat with a conical taper thereto inside of the tube adjacent the discharge port, and a valve body slidable within the tube between open and closed positions with the first valve seat. The valve body has a conical tapered end portion which complements the conical taper of the first valve seat of the tube. At least one spring normally biases the valve body to closed position against the first valve body which extends through the discharge port of the tube and closes it when the valve body is in closed position against the first valve seat. A cylindrical inner wall of the tube to form a second valve seat between the flared storage chamber and a metering chamber formed between the ends of the valve body with the cylindrical inner wall of the tube for the purpose of controlling the amount of medium dispensed during use of the device.

U.S. Pat. No. 4,625,897 describes a metering dispenser assembly having a squeeze bottle with a metering cup fitting the neck of the bottle and carrying a dip tube which extends to the bottom of the bottle. The dip tube, or at least a pillar into which it fits, terminates at a level between the top and bottom of the cup, and there is a vent hole at this level to provide communication between the container and atmosphere. The vent is small enough not to allow significant leakage from the cup during a dispensing operation. The vent could instead be alongside the dip tube.

U.S. Pat. No. 4,779,767 describes a pre-measure dispensing device that is made of translucent plastic material adapted to be screwed onto the top of a bottle to pre-measure fluid dispensed from said bottle. The bottle may be deformable so that when squeezed, fluid goes up the tube into the measuring device. The bottle can then be tipped to expel the exact amount of the fluid desired.

U.S. Pat. No. 5,127,553 describes a liquid metered dispensing container of the squeezable type. The squeezable container has an opening for dispensing liquid therefrom at one end and a bottom at the other end. A non-flexible trap chamber is connected to the opening and extends outwardly therefrom. The trap chamber has a lower end inserted into the container opening and has an inlet orifice extending from the lower end into the container. The inlet orifice is adapted to receive a dip tube which is attached thereto and extends close to or at the bottom of the container. The trap chamber has an upper end with a dispensing orifice. This is small enough to prevent dripping of liquid therefrom by gravity when the bottle is inverted but is large enough to dispense liquid therefrom when the bottle itself is squeezed. A one way valve is connected to the lower end of the trap chamber which permits liquid to flow from the container to the trap chamber but not vice versa. The trap chamber may have indicia so that the exact dosage levels of different amounts may be squeezed into the chamber, or the chamber itself may have a single, predetermined volume.

U.S. Pat. No. 5,199,808 describes an applicator device comprising a receptacle, which is closed by a tearable cover, and a deformable applicator element, in which, between the applicator element and the cover, is a round body retained by a retaining device. Under the effect of pressure exerted on the applicator element, which is transmitted to the rounded body, said rounded body tears the cover and falls into the receptacle.

U.S. Pat. No. 5,568,990 describes a liquid applicator with a self-sealing feature. The applicator includes a housing, a valve member and a spring member. The housing has an aperture through its top wall and an annular sleeve projecting inwardly from an edge of annular sleeve having an end portion. The valve member includes an actuating part that is slideably received by the annular sleeve and a sealing part that is shaped to form a releasable seal with the end portion of the annular sleeve. The valve and spring members are disposed in an axially displaceable relation such that the actuating part of the valve member is resiliently urged into the annular sleeve; that a part of the actuating part protrudes from the top wall of the housing; and that the sealing part of the valve member sealably engages with the end portion of the annular sleeve.

U.S. Pat. No. 5,899,624 describes a fluid dispensing valve used for printing and marking, having a valve body with an end wall which defines an aperture and a spring biased valve element disposed within the valve body to open and close the aperture. A spring element is coupled to the tubular body adjacent the circular wall, the spring element and the wall defining a chamber for receiving a fluid metered through the aperture of the valve body when the aperture is opened, the spring element having at least one aperture communicating with the chamber. A porous member transfers the fluid received in the chamber to a surface in the form of a printed geometric image. In operation, a printing force applied to the porous member causes the spring element to compress and engage the portion of the valve element thereby pushing a portion of the valve element partially back through the aperture in the open position to allow the passage of a marking fluid therethrough to the chamber to wet the porous member. The porous member has a predetermined rigidity which substantially prevents the porous member from distorting from its predetermined geometric shape under the printing force. The fluid dispensing valve is typically affixed to the open end of a container which contains the fluid to be dispensed. A removable cap is provided for covering the valve when it is not being used.

U.S. Pat. No. 6,758,620 B1 describes a metered dose dispensing dabber device that includes a dabber main housing having a container attachment for affixing the device to a container, a metered dosage reservoir, a hollow dip tube, a metered dosage reservoir outlet, and a valve. The main housing has a base divider wall, this base divider wall having an underside and top side. Further, the base divider wall is closed to prevent liquid from passing from the underside to the top side. The metered dosage reservoir has enclosed walls and is located above the top side of the divider wall. The hollow dip tube passes through the base divider wall and extends downwardly therefrom for insertion into a container. The dip tube also extends upwardly to a predetermined height in the metered dosage reservoir to establish a fill level. The metered dosage reservoir outlet is located on a metered dosage reservoir wall opposite the dip tube. The valve is located in the reservoir outlet, in proximity to the dip tube. The valve has a first position wherein the reservoir outlet is closed and the dip tube is open, and has a second position wherein the reservoir outlet is open and the dip tube closed. The device is attached to a container. A user squeezes a container to fill the reservoir (dab) the metered dosage.

Pakistan Patent No. 110,059 describes a collapsible container comprising a dispensing chamber including a measuring cup, a tube leading from near one end of the container and projecting into the measuring cup, a tube leading from near one end of the container and projecting into the measuring cup so that liquid is forced through the tube and into the chamber when the container is collapsed, the size of the measuring cup and the position of a discharge opening or openings in the projecting part of the tube determining a measured quantity of liquid to be dispensed from the container, and an outlet through which liquid can be discharged from the chamber. The invention is particularly applicable to containers for hair treatment liquids, but the containers can obviously be used for other liquids which need to be dispensed in measured quantities.

Netherlands Patent No. 7,613,833 describes a liquid metering device that is intended for a bottle and comprises a stopper fitting in or on the bottle opening and containing a chamber with bottom and side walls and an outlet. A tube enters the chamber and is connected, at its lower end, to a rigid tube or hose extending toward the bottom of the bottle. The tube orifice is at a predetermined level above the chamber bottom and below the outlet which is a narrow jet orifice. The volume of the chamber is preferably at least twice the volume determined by the position of the tube orifice.

Netherlands Patent No. 7,712,828 describes a container made from a flexible material that is combined with a second container. They are used for tapping a fixed amount of liquid accurately. The two holders are interconnected via a tube. The second holder has a discharge hole surrounded by a neck with an external thread. The ends of the tube are located near the ends of the holders facing away from each other. The second holder is partially made from transparent material and has a scale division. The tube is fixed to the second holder. The hole is in the first holder.

Germany Patent No. 1,075,967 describes a dosing and transport bottle of a transparent and resilient synthetic material, having attached to the neck a transparent dosing container connected to the interior via a riser pipe.

Europe Patent No. 383,644 A1 describes a dispensing container that includes a liquid reservoir with a screw fitting cap. A dispensing chamber is defined within the space over which the cap fits. The volume of the chamber is variable, with the side walls of the chamber being formed of a bellows. The base of the bellows chamber includes an opening with a tube extending into the liquid. The tube also includes a non-return valve. The cap includes an inner protrusion, so that when fitted it depresses the bellows, and when removed, the bellows expand to fill the chamber with liquid.

Germany Patent No. 3,819,098 A1 describes a dosing chamber emptied by pouring that is connected to a liquid in a reservoir chamber with a flexible wall via a rising tube. The rising tube connects to a dosing shaft in the dosage chamber with a liquid aperture above the dosage chamber base. The dosage chamber is in the form of a beaker whose inner wall has a peripheral marking offset from the bounding wall. The marking is visible by looking through the beaker opening into the beaker's interior. The marking may be in the form of an annular step in the beaker's wall.

Notwithstanding the prior art, the present invention is neither taught nor rendered obvious thereby.

SUMMARY OF THE INVENTION

The present invention relates to liquid metered dispensing squeeze bottles. The bottles include: (a.) a squeezable container having an opening for dispensing liquid therefrom at one end and a bottom at the other end; (b.) a non-flexible trap chamber of a predetermined volume, connected to the opening of the container; (c.) a dip tube; (d.) a one way valve at the bottom of the dip tube; and, (e.) a brush connected to the trap chamber at its upper end and functionally connected to the dispensing orifice(s). The brush may be a separate component inserted into the top of the trap chamber or it may be integrally formed therewith, i.e., made from a single mold.

The trap chamber has a lower end which is inserted into the container opening and has an inlet orifice extending from the lower end and into the container.

The dip tube has an upper end extending from the inlet orifice and extending downwardly into the container, and has a lower end at or near the bottom of the container. The dip tube and all or part of the trap chamber may be unistructurally molded or may be assembled in parts.

The one way valve system is connected to the lower end of the dip tube and it permits liquid to flow from the container into the dip tube but not from the dip tube to the container.

In some embodiments, the trap chamber has indicia that indicate predetermined volume levels.

In some embodiments, to enhance assembly, the non-flexible trap chamber has either the male or female portion of a snap-in lock for permanent insertion into the opening of the container, and the container has the other of the male or female portion of the snap-in lock.

In some embodiments, the squeezable container contains a liquid for dispensing which fills the container to a predetermined level below the trap chamber to create an air space therebetween.

In some embodiments, the liquid metered dispensing bottle one way valve system has a ball valve with a ball stop contained within a tapered valve housing having an inlet orifice at its lowest area, and the ball stop is positioned to prevent the ball from contacting and blocking the dip tube from receiving air when the squeezable container is inverted and squeezed.

The liquid metered dispensing bottle wherein the trap chamber has indicia which indicate predetermined volume levels.

In some preferred embodiments, the liquid metered dispensing bottle one way valve system includes: (i.) a valve housing with two opposing sidewalls and two inlet orifices, the two inlet orifices being a first inlet orifice being located on one of the two opposing sidewalls and a second inlet orifice being located on the other of the two opposing sidewalls, each of the two opposing sidewalls being non-vertical and non-horizontal on their insides, and (ii.) two slide valves, one being located at the first inlet orifice and the other being located at the second inlet orifice, each of the two slide valves having a rest position when the bottle is upright wherein both inlet orifices is closed, and having a second position when the bottle is inverted 180 degrees wherein both inlet orifices are open to air, and having a third position when the bottle is upright and squeezed wherein at least one of the inlet orifices are open to air and having a fourth position when the bottle is rotated 90 degrees from upright wherein one of the inlet orifices is open to air and the other of the orifices is closed. Further, when the bottle is rotated 90 degrees, and the valves are in their fourth position, in some embodiments, one of the inlet orifices is more elevated than the other of the inlet orifices, and wherein the more elevated inlet orifice is open to air and the other is closed. In some embodiments, the two slide valves are on opposing ends of a single valve element.

BRIEF DESCRIPTION OF THE DRAWINGS

The present invention should be more fully understood when the specification herein is taken in conjunction with the drawings appended hereto wherein.

DETAILED DESCRIPTION OF THE PRESENT INVENTION

The present invention liquid metered dispensing bottle is one which may be operated in three simple steps. First, the user holds the squeezable container in its normal, upright position and squeezes the side walls so as to force liquid up a dip tube and into a trap chamber. A valve located at the bottom of the dip tube keeps the liquid that has been moved into the chamber from draining back into the container. The sum content remaining in the trap chamber and dip tube above the valve is the metered or premeasured dose. Second, the user merely inverts the container and the air pocket which now rises to the inverted bottom creates a buffer between the trap chamber liquid and the remaining liquid in the bottle. Third, the container is squeezed in this inverted position, and air is forced down the dip tube and forces out the metered amount of liquid. The dispensed liquid flows along the brush bristles by gravity and is then brushed onto the desired surface or substrate.

The present invention bottle may involve any type of squeezable container and the trap chamber is generally non-flexible so as to not distort the predetermined volume thereof. In fact, given a dip tube of appropriate volume, in some embodiments, the dip tube itself may also be the trap chamber. Usually, however, they are different sections of the device. While not a critical feature of the present invention, the liquid metered dispensing bottle may include some type of lid or cover and this may be a pop-in, a flip top, a screw cap, a snap cap or any other type of closure which is known to the art. These would include, but not be limited to, childproof type closures, as the product may dictate.

Figure 1:
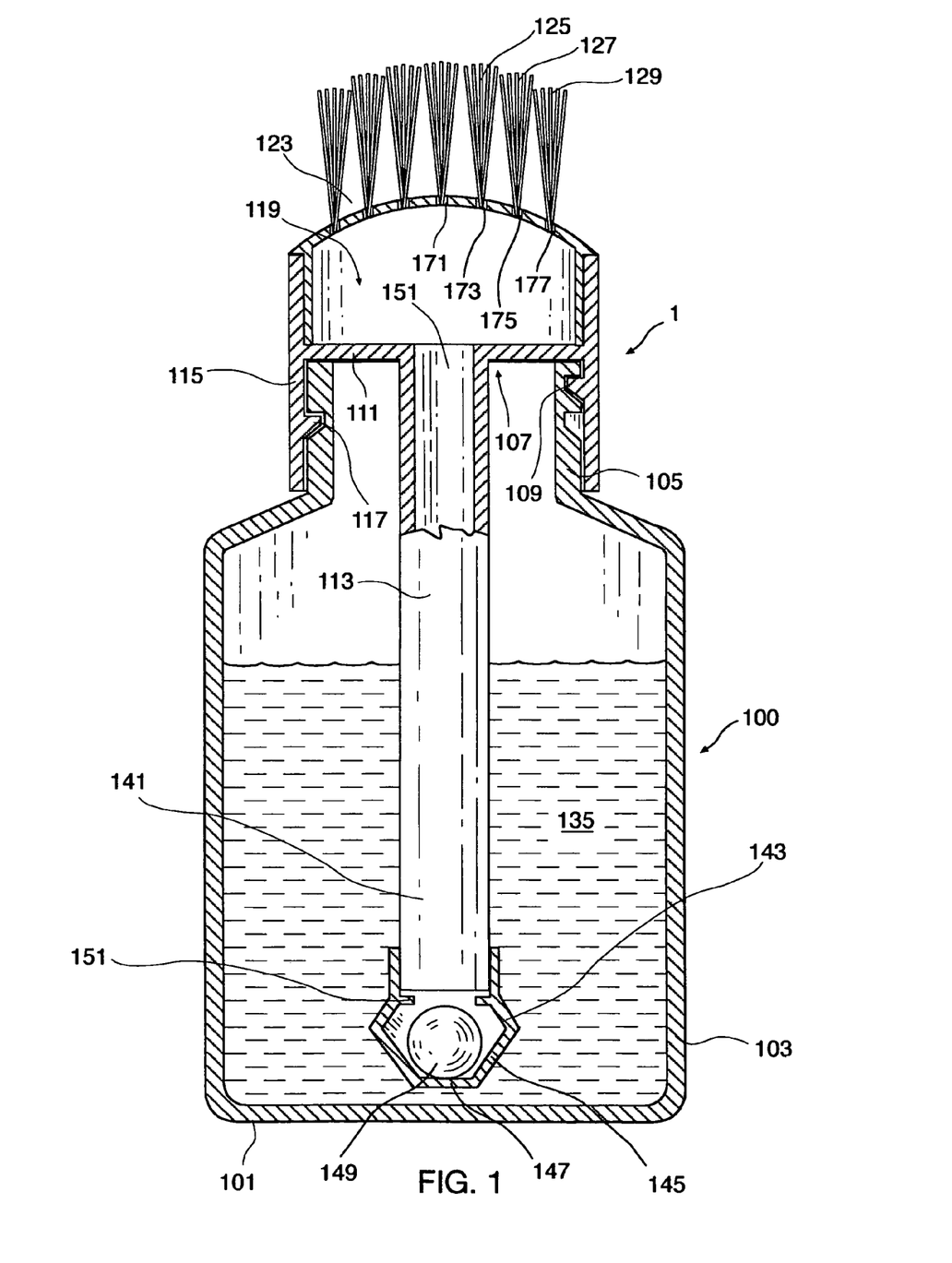
FIG. 1 shows a side cut view of one embodiment of a liquid metered dispensing squeeze bottle of the present invention with liquid contained therein.

Referring now to FIG. 1, there is shown squeezable container 100 which has a container sidewall 103, bottom 101, and a container neck 105. Container neck 105 has container opening 107 and also has container threads 109. These container threads 109 are optional in this case and could be snap fit or other attachment arrangement. Trap chamber 119 has a lower end 111 as shown, with inlet orifice 151, and, in this case, a curved top upper end 123. This upper end 123 has a plurality of brush bristles, such as bristles 125, 127, and 129. Dispensing orifices, such as dispensing orifices 171, 173, 175, and 177 are located around or near the brush bristles. The exact diameter of the orifice(s) will be dictated by the viscosity of the liquid 135 contained in squeezable container 1, and this is well within the skill of the artisan. An overcap (not shown) would be appropriate to prevent evaporation or leaking from accidental pressure.

Trap chamber 119 inlet orifice 151 extends into dip tube 113, as shown. Further, trap chamber 119 and dip tube 113 may be of a specific volume so as to meet a single or double dosage requirement, or it may be graded with indicia to indicate different predetermined or metered volumetric amounts. In many embodiments, level lines such as dashed or raised liquid level lines and indicia such as the "3 cc" shown as indicia 31.

Trap chamber 113 may be integrally molded with dip tube 113, or they may be formed separately and connected to one another. Trap chamber 113 may be attached to a squeezable container 100 by any known mechanism and may be heat welded, glued, irreversibly screwed in, irreversibly snapped in, or the like. In its particular embodiment, threads 109 receive threads 117 of the cap-like extension 115 of trap chamber 119. A stop or thread lock could prevent or discourage unscrewing. In another embodiment, a snap lock female component is located on the inside of neck while a snap lock male component is located on the outside of trap chamber and the trap chamber is pushed into the opening of the container so that the female component and the male component interlock.

At the bottom end 141 of dip tube 113 is a valve mechanism 143. It has a tapered wall 145 and inlet orifice 147, as well as a valve ball 149. Ball 149 rests and closes orifice 147 as shown, when the container 100 is upright. While upright, the container is squeezed by a user and liquid will flow into the dip tube 113 and the trap chamber 119 until it fills the trap chamber or until the user reaches a predetermined level, the trap chamber may be transparent or translucent, and level marks, discussed above, may be included. Stops, such as stop 151 (e.g. a spider screen) would stop ball 149 from blocking upwardly when container 100 is squeezed.

The user would squeeze container 100 in its upright position to fill the top chamber 119 and dip tube 113 to get a dose of liquid 135. Then, the user would simply invert and squeeze again to dispense the dose.

Figure 2:
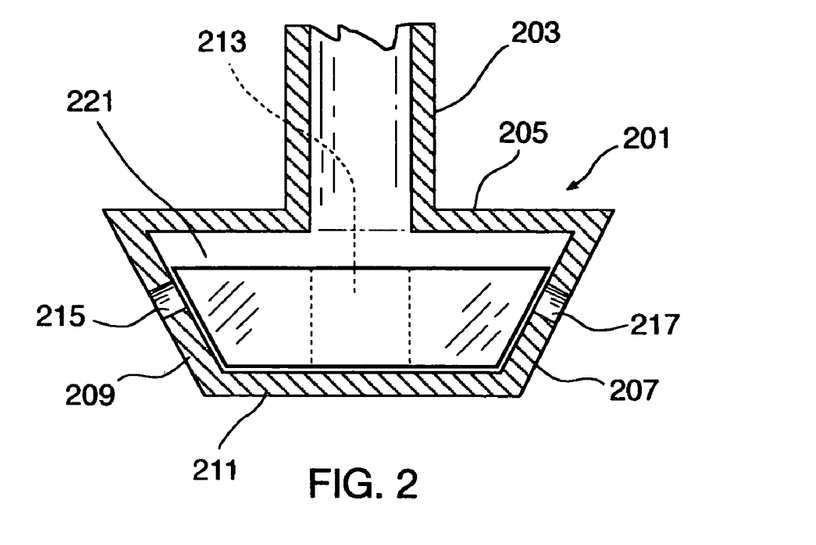
FIGS. 2, 3 and 4 show side cut views of a valve system having a trapezoidal side profile that is a preferred embodiment of a present invention bottle.

In FIG. 2, the concept of a different type of valve is shown. This is a dual inlet valve wherein one, both or more of the inlets is open, depending upon both the action (or inaction) and position. In FIG. 2, a valve system 201 for use in a present invention metered dose squeeze dispenser has a trapezoidal shape valve housing connected to the lower end of a dip tube. This would be in place of the ball valve system at the bottom of dip tube 113 in FIG. 1. The housing includes a wide top 205 and a narrow bottom 211 with opposing tapered sides 207 and 209. Each of these tapered sides has an inlet port or orifice, mainly, orifices 217 and 215, respectively. Valve 221 has a central bore 213 and is a trapezoidal block to occupy about 40% to 90% of the volume within the housing.

For purposes of this discussion, valve system 201 may be visualized on the bottom of container 100 in FIG. 1. In FIG. 1, it is at rest in an upright position and this is likewise the positioning of FIG. 2. In FIG. 2, block 221 is at rest and seals both inlet orifices 215 and 217.

Figure 3:
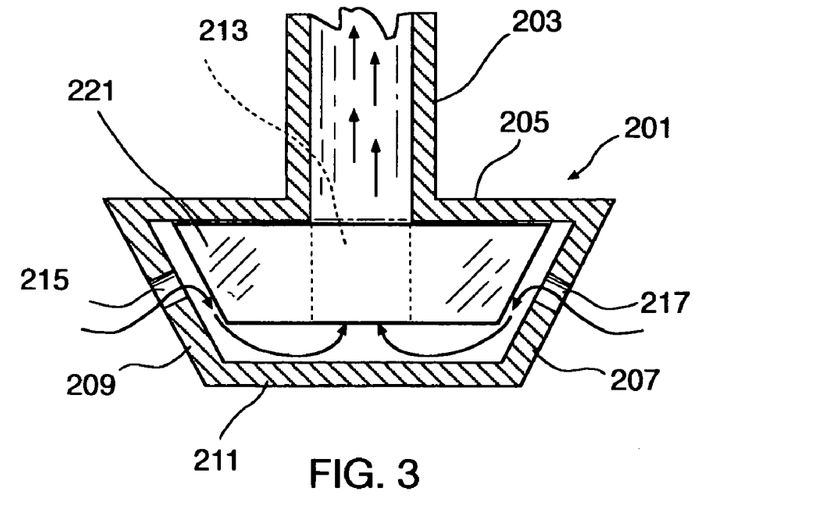

In FIG. 3, identical parts are identically numbered. However, FIG. 3 depicts valve system 201 during user squeezing of the bottle. Here, valve 221 is pushed upwardly from the liquid being squeezed into inlet orifices 215 and 217. Further, this liquid passes through bore 213, up dip tube 203, and into a trap chamber, such as trap chamber 119 of FIG. 1. When the user releases the squeezing, valve 221 settles back down, as shown in FIG. 2, and maintains the trapped dosage in the trap chamber and the dip tube.

Figure 4:
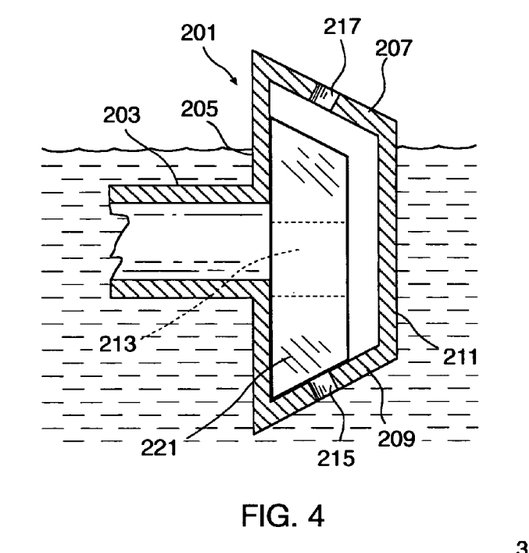

Next, the user tips or inverts the container and valve system 201 becomes horizontal, tilted or inverted. FIG. 4 shows the valve system in a nonupright position, with identical parts identically numbered. In this figure, a user has turned the container essentially horizontally. Note that the upper of the two inlet orifices, mainly orifice 217, is open and valve 221 has closed inlet orifice 215. When the user now squeezes the container, air enters inlet valve 217, passes through bore 213 and dispenses the trapped dose of liquid. If the FIG. 4 depiction showed dip tube 203 and valve system 201 tilted more downwardly to the left (container even more tilted or inverted), valve 221 would still shut off the lower inlet and open upper inlet. In other words, the submerged inlet would be shut off and the inlet exposed to air would be open. If valve system 201 were entirely inverted, one or both inlets would be open, but they would both be exposed to air so that the device would still function as described above.

Figure 5:
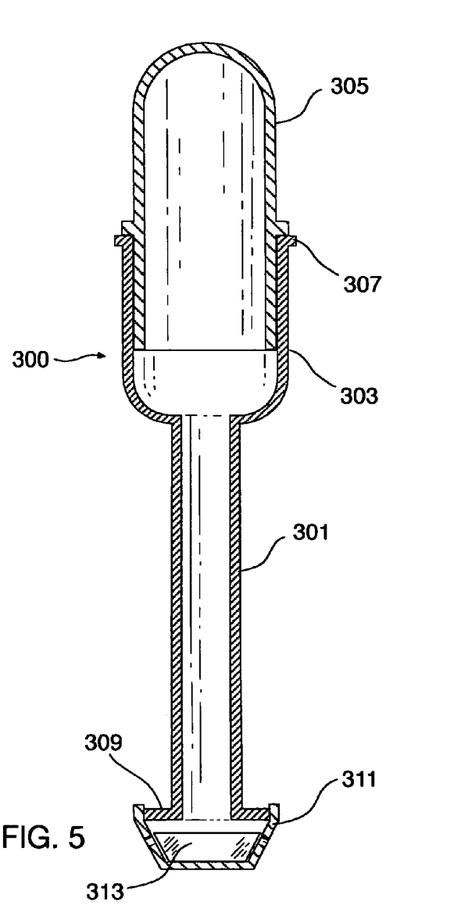
FIG. 5 shows a side cut view of the insertion components of a present invention bottle that includes the trap chamber, the dip tube and the valve system; and, FIG. 6 illustrates another preferred embodiment of the present invention liquid metered dispensing bottle.
Figure 6:
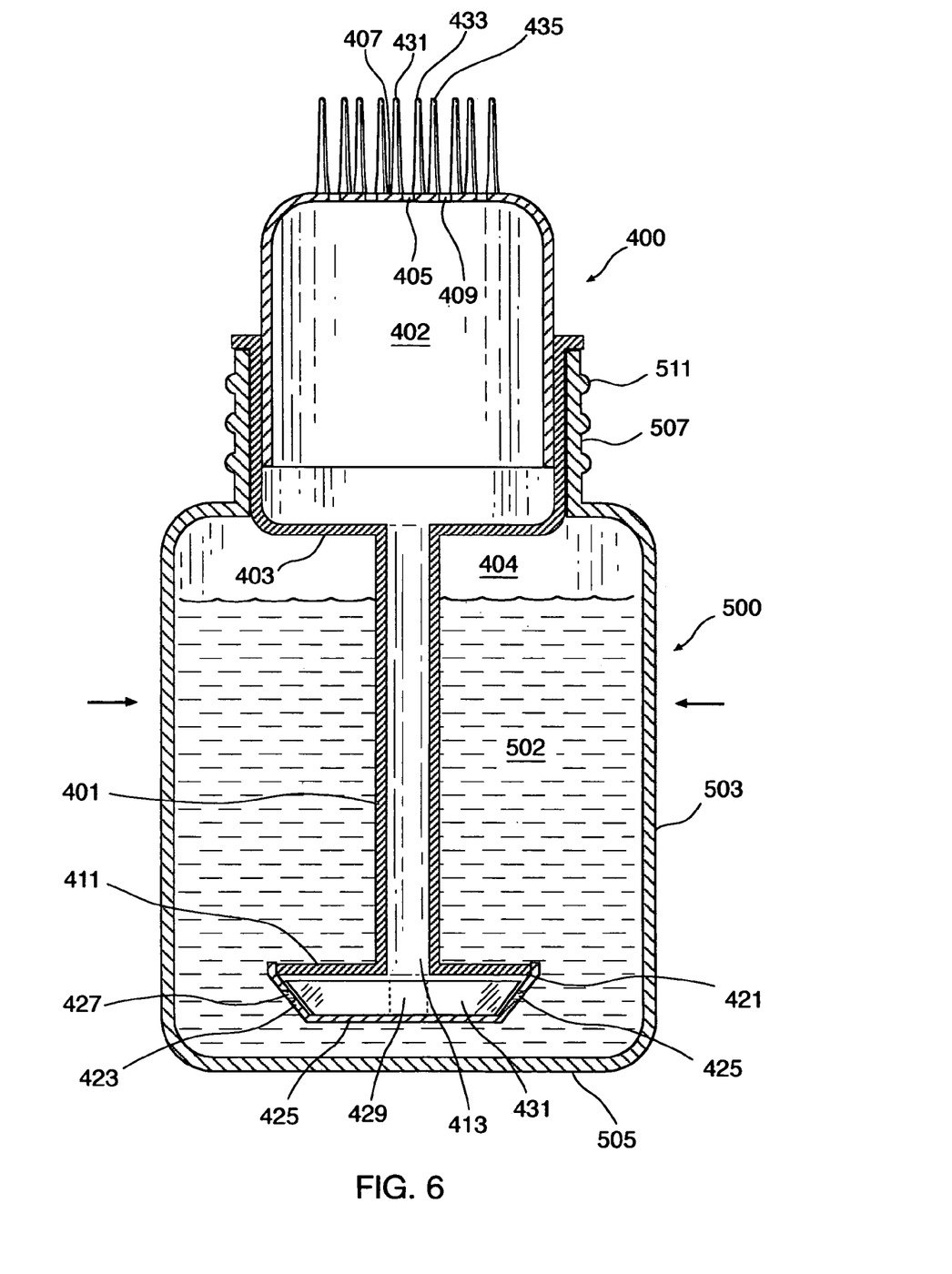

FIG. 5 shows another embodiment of a present invention device for insertion into a container such as shown in FIG. 6. In this FIG. 5, present invention insertion components 300 include a dip tube 301 at its top and a flange 309 at its bottom. Bowl 303 is adapted for snap fit connection of trap chamber top 305 by interlocking at flange 307. Flange 309 is adapted to function as a top portion of valve housing. Bottom portion 311 completes the sides and bottom to create a valve housing similar to that shown in FIG. 2. Valve 313 is contained therein and functions as described in FIGS. 2, 3 and 4 above. The dip tube 301 has a plurality of orifices at its top that are adapted to receive brush bristles. These may be synthetic or natural materials or combinations thereof and may be inserted in collective clumps in some or all orifices. Attachment to the orifices may be by heat weld, glue, force fit, or any other known attachment mechanism.

FIG. 6 shows a squeezable container 500 in its upright position and being squeezed by a user at the side arrows. Insertion components 400 of FIG. 6 is similar to insertion components 300 in FIG. 5 above, except that the trap chamber and valving system are much wider. It should generally be noted that the width of the bottles, such as bottle 500 in FIG. 6, may be two to five times the depth. Hence, in many embodiments, the container will have an elongated top view footprint, as will the trap chamber and the valve system.

Insertion components 400 include dip tube 401 and with bowl 403 at its top and valve cover flange 411 at its bottom. Top portion 405 of trap 402 is inserted into bowl 403, as shown. An overcap, not shown could be screwed into threads 511 of bottleneck 507. Bottle 500 includes side walls such as wall 503 and flat bottom 505. Liquid 502 is contained therein to illustrate liquid content with air space 404.

Valve cover flange 411 has a valve housing attached to it which includes tapered walls 421 and 423 and bottom 425. The tapered walls 421 and 423 include inlet orifices 425 and 427, as shown. Trapezoidal valve 431 has a central bore 429 and functions similarly to the valve systems described in FIGS. 2 through 4 above. Top 407 of trap chamber 402 has a plurality of dispensing orifices, such as orifices 405 and 409. Integrally formed with top 407 of trap chamber 402 is a brush having a plurality of bristles such as bristles 431, 433, and 435, for brushing application of liquid 502. When trap chamber 402 and dip tube 401 are filled via inlets 425 and 427 and bore 429 and dip tube base 413, the container 500 is inverted and squeezed again to release a trapped dosage via dispensing orifices such as orifice 409 in top 407 onto the brush bristles for application to the desired substrate or surface via brushing.

Obviously, numerous modifications and variations of the present invention are possible in light of the above teachings.

For example, while the dispensing orifices in some embodiments are small enough to prevent dripping of a liquid via gravity when inserted, but large enough to dispense liquid when the container is squeezed, in other versions, there may be one or more dispensing orifices that are larger and could leak without squeezing, but could have an appropriate sealing overcap. As another example of an alternative, the one way valve system could be imperfect and could slow flow back so that if a user overfilled, slow drain would enable recovery to the desired dosage without wasting content. On the other hand, a full trap chamber could equal exact dosage and the need for drainage back would obviated. It is, therefore, understood that within the scope of the appended claims, the invention may be practiced otherwise than as specifically described herein.

What is claimed is:

1. A liquid metered dispensing bottle, comprising:
   (a.) a squeezable container having an opening for dispensing liquid therefrom at one end and a bottom at the other end;
   (b.) a non-flexible trap chamber of a predetermined volume, connected to said opening of said container, said trap chamber having a lower end which is inserted into said container opening and having an inlet orifice extending from said lower end and into said container, said trap having an upper end with at least one dispensing orifice;
   (c.) a dip tube, said dip tube having an upper end extending from said inlet orifice and extending downwardly into said container, said dip tube having a lower end at or near the bottom of said container;
   (d.) a one way valve system connected to said lower end of said dip tube which permits liquid to flow from the container into said dip tube but not from said dip tube to said container, wherein said one way valve system includes:
      (i.) a valve housing with two opposing sidewalls and two inlet orifices, said two inlet orifices being a first inlet orifice being located on one of said two opposing sidewalls and a second inlet orifice being located on the other of said two opposing sidewalls, each of said two opposing sidewalls being non-vertical and non-horizontal on their insides, and
      (ii.) two slide valves, one being located at said first inlet orifice and the other being located at said second inlet orifice, each of said two slide valves having a rest position when said bottle is upright wherein both inlet orifices is closed, and having a second position when said bottle is inverted 180 degrees wherein both inlet orifices are open to air, and having a third position when said bottle is upright and squeezed wherein at least one of said inlet orifices are open to air and having a fourth position when said bottle is rotated 90 degrees from upright wherein one of said inlet orifices is open to air and the other of said orifices is closed; and,
   (e.) a brush connected to said trap chamber at its upper end and functionally connected to said at least one dispensing orifice.

2. The liquid metered dispensing bottle of claim 1 wherein said trap chamber has indicia which indicate predetermined volume levels.

3. The liquid metered dispensing bottle of claim 1 wherein said non-flexible trap chamber has either the male or female portion of a snap-in lock for permanent insertion into the opening of said container and said container has the other of the male or female portion of said snap-in lock.

4. The liquid metered dispensing bottle of claim 1 wherein said squeezable container contains a liquid for dispensing which fills the container to a predetermined level below said trap chamber to create an air space therebetween.

5. The liquid metered dispensing bottle of claim 1 wherein said dispensing orifice having a diameter small enough to prevent dripping of a liquid therefrom by gravity when inverted but being large enough to dispense liquid therefrom when said container is inverted and squeezed the exact diameter of the orifice being dictated by the viscosity of the liquid.

6. The liquid metered dispensing bottle of claim 1 wherein when said bottle is rotated 90 degrees, and said valves are in their fourth position, one of said inlet orifices is more elevated than the other of said inlet orifices, and wherein the more elevated inlet orifice is open to air and the other is closed.

7. The liquid metered dispensing bottle of claim 1 wherein said trap chamber has indicia which indicate predetermined volume levels.

8. The liquid metered dispensing bottle of claim 1 wherein said brush is selected from the group consisting of a separately created, attached brush and a brush integrally formed with said trap chamber.

9. The liquid metered dispensing bottle of claim 1 wherein said squeezable container contains a liquid for dispensing which fills the container to a predetermined level below said trap chamber to create an air space therebetween.

10. The liquid metered dispensing bottle of claim 1 wherein two slide valves are located on opposite ends of a single valve component.

11. The liquid metered dispensing bottle of claim 1 wherein said two trap slide valves are separate from one another and are each maintained in a slide track that permits movement along its sidewall and away from and toward its sidewall, and maintains functional orientation of said slide valve.

12. A liquid metered dispensing bottle, comprising:
   (a.) a squeezable container having an opening for dispensing liquid therefrom at one end and a bottom at the other end;
   (b.) a non-flexible trap chamber of a predetermined volume, connected to said opening of said container, said trap chamber having a lower end which is inserted into said container opening and having an inlet orifice extending from said lower end and into said container, said trap having an upper end with at least one dispensing orifice;
   (c.) a dip tube, said dip tube having an upper end extending from said inlet orifice and extending downwardly into said container, said dip tube having a lower end at or near the bottom of said container;
   (d.) a one way valve system connected to said lower end of said dip tube which permits liquid to flow from the container into said dip tube but not from said dip tube to said container, wherein said one way valve system includes:
      (i.) a generally inverted trapezoidal valve housing with tapered opposing sidewalls with an inlet orifice in each of said sidewalls, and
      (ii.) an inverted trapezoidal valve having opposing slide valve ends, and having a rest position when said bottle is upright wherein both inlet orifices are closed, and having a second position when said bottle is inverted 180 degrees wherein both inlet orifices are open to air, and having a third position when said bottle is upright and squeezed wherein at least one of said inlet orifices are open to air and having a fourth position when said bottle is rotated 90 degrees from upright wherein one of said inlet orifices is open to air and the other of said orifices is closed; and, (e.) a brush connected to said trap chamber at its upper end and functionally connected to said at least one dispensing orifice.

13. The liquid metered dispensing bottle of claim 12 wherein when said bottle is rotated 90 degrees, and said valve is in its fourth position, one of said inlet orifices is more elevated than the other of said inlet orifices, and wherein the more elevated inlet orifice is open to air and the other is closed.

14. The liquid metered dispensing bottle of claim 12 wherein said trap chamber has indicia which indicate predetermined volume levels.

15. The liquid metered dispensing bottle of claim 12 wherein said non-flexible trap chamber has either the male or female portion of a snap-in lock for permanent insertion into the opening of said container and said container has the other of the male or female portion of said snap-in lock.

16. The liquid metered dispensing bottle of claim 12 wherein said squeezable container contains a liquid for dispensing which fills the container to a predetermined level below said trap chamber to create an air space therebetween.

17. The liquid metered dispensing bottle of claim 12 wherein said inverted trapezoidal valve has a vertical central orifice at least partially aligned with said dip tube.

18. The liquid metered dispensing bottle of claim 12 wherein said valve housing has flat inside sidewalls at predetermined angles and said opposing slide valve ends are flat with corresponding predetermined angles.

* * * * *